US008749804B2

(12) United States Patent
Harasawa

(10) Patent No.: US 8,749,804 B2
(45) Date of Patent: Jun. 10, 2014

(54) IMAGE FORMING APPARATUS, IMAGE FORMING SYSTEM, AND COMPUTER PROGRAM PRODUCT FOR SETTING A CONVEYING SPEED

(75) Inventor: Yusuke Harasawa, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 79 days.

(21) Appl. No.: 13/369,710

(22) Filed: Feb. 9, 2012

(65) Prior Publication Data

US 2012/0206753 A1 Aug. 16, 2012

(30) Foreign Application Priority Data

Feb. 14, 2011 (JP) ................................ 2011-028929

(51) Int. Cl.
*G06F 3/12* (2006.01)

(52) U.S. Cl.
USPC .......... 358/1.13; 358/437; 358/486; 358/488; 358/498

(58) Field of Classification Search
CPC ....... H04N 1/00652–1/00657; H04N 1/00793; H04N 21/4424; H04N 2201/0454; H04N 2201/3335
USPC ......................................... 358/1.1–3.29, 498
See application file for complete search history.

(56) References Cited

U.S. PATENT DOCUMENTS

2008/0068681 A1* 3/2008 Ishido .......................... 358/498
2008/0260446 A1 10/2008 Harasawa

FOREIGN PATENT DOCUMENTS

JP 2004-170560 6/2004

OTHER PUBLICATIONS

U.S. Appl. No. 11/934,329, filed Nov. 2, 2007, Yusuke Harasawa.

* cited by examiner

*Primary Examiner* — Benny Q Tieu
*Assistant Examiner* — Marcellus Augustin
(74) *Attorney, Agent, or Firm* — Oblon, Spivak, McClelland, Maier & Neustadt, L.L.P.

(57) ABSTRACT

An image forming apparatus includes: an original conveying unit that conveys an original; an original scanning unit that scans the original conveyed by the original conveying unit so as to generate an image of the original; a plotter unit that draws the image on a recording medium; an abnormality detecting unit that detects an abnormality in the plotter unit; and a control unit that, when the abnormality detecting unit detects the abnormality in the plotter unit, shuts off first power supply to the original scanning unit, and sets a first conveying speed of the original by the original conveying unit to be higher than a second conveying speed when the original is scanned by the original scanning unit.

11 Claims, 12 Drawing Sheets

FIG.5

| MODE/ MAGNIFICATION | 400% | 100% | 50% | 25% |
|---|---|---|---|---|
| MONOCHROME | 20 mm/s | 80 mm/s | 160 mm/s | 160 mm/s |
| COLOR | 6.7 mm/s | 26.7 mm/s | 53.3 mm/s | 53.3 mm/s |

FIG.6

| MODE/MAGNIFICATION | | 400% | 100% | 50% | 25% |
|---|---|---|---|---|---|
| MONOCHROME | DURING SCANNING | 20 mm/s | 80 mm/s | 160 mm/s | 160 mm/s |
| | AFTER SWITCHING | 180 mm/s | 180 mm/s | 180 mm/s | 180 mm/s |
| COLOR | DURING SCANNING | 6.7 mm/s | 26.7 mm/s | 53.3 mm/s | 53.3 mm/s |
| | AFTER SWITCHING | 180 mm/s | 180 mm/s | 180 mm/s | 180 mm/s |

FIG.8

| UNIT | PLUG-IN MODE | STANDBY MODE | SCANNER MODE | FIRST PRINT MODE | SECOND PRINT MODE | SLEEP MODE | PLOTTER ABNORMALITY SCANNER MODE |
|---|---|---|---|---|---|---|---|
| SYSTEM CONTROL UNIT | OFF | ON | ON | ON | ON | PARTIALLY ON | ON |
| EXTERNAL I/F UNIT | OFF | ON | ON | ON | ON | ON | ON |
| PLOTTER UNIT | OFF | ON | ON | ON | ON | OFF | OFF |
| SCANNER CONTROL UNIT | OFF | ON | ON | ON | OFF | OFF | ON |
| SCANNER IMAGE PROCESSING UNIT | OFF | OFF | ON | OFF | OFF | OFF | OFF |
| OPERATING UNIT | OFF | ON | ON | ON | PARTIALLY ON | PARTIALLY ON | ON |

IMAGE FORMING APPARATUS, IMAGE FORMING SYSTEM, AND COMPUTER PROGRAM PRODUCT FOR SETTING A CONVEYING SPEED

CROSS-REFERENCE TO RELATED APPLICATIONS

The present application claims priority to and incorporates by reference the entire contents of Japanese Patent Application No. 2011-028929 filed in Japan on Feb. 14, 2011.

BACKGROUND OF THE INVENTION

1. Field of the Invention

The present invention relates to an image forming apparatus, an image forming system, and a computer program product.

2. Description of the Related Art

An image forming apparatus, such as a digital copying machine, comes into wide use as an integral instrument in an office environment or the like. In recent years, from the viewpoint of reduction in cost or environmental protection, there are numerous efforts to reduce power in such an image forming apparatus.

For example, Japanese Patent Application Laid-open No. 2004-170560 discloses an image forming apparatus in which, if an abnormal state occurs, the image forming apparatus stores information on operation conditions at the time when the abnormal state occurs in a non-volatile random access memory (NVRAM) and transitions to abnormality energy-saving mode in which less power is consumed, then the presence/absence of an abnormal state release operation to release the abnormal state is monitored, and finally if the abnormal state release operation is performed, the operation mode returns to normal operation mode from the abnormality energy-saving mode on the basis of the operation condition information stored in the NVRAM.

However, in the image forming apparatus disclosed in Japanese Patent Application Laid-open No. 2004-170560, if an abnormality, such as a sheet jam, sheet exhaustion, or toner exhaustion, occurs in a plotter unit, the operation mode transitions to the abnormality energy-saving mode to inhibit electrical conduction to the entire engine control unit, so that not only the plotter unit but also a scanning unit are stopped so as to achieve reduction in power consumption. For this reason, when an abnormality occurs in the plotter unit while the scanning unit is scanning a document, original conveying in the scanning unit is stopped on the way, which makes it necessary for an operator to release an abnormal state in the plotter unit, for example, to remove jam and to then remove the document that has been stopped on the way. In particular, when a wide and long document is scanned, or the like, there is a problem in that it takes a lot of efforts to remove the document.

The present invention has been made in view of the above-described situation, and there is a need to provide an image forming apparatus, an image forming system, and a computer program product capable of saving labor of removing an original while achieving reduction in power consumption.

SUMMARY OF THE INVENTION

It is an object of the present invention to at least partially solve the problems in the conventional technology.

An image forming apparatus includes: an original conveying unit that conveys an original; an original scanning unit that scans the original conveyed by the original conveying unit so as to generate an image of the original; a plotter unit that draws the image on a recording medium; an abnormality detecting unit that detects an abnormality in the plotter unit; and a control unit that, when the abnormality detecting unit detects the abnormality in the plotter unit, shuts off first power supply to the original scanning unit, and sets a first conveying speed of the original by the original conveying unit to be higher than a second conveying speed when the original is scanned by the original scanning unit.

An image forming system includes a scanner device and a plotter device that are communicably connected to each other. The scanner device includes an original conveying unit that conveys an original, an original scanning unit that scans the original conveyed by the original conveying unit so as to generate an image of the original, a first transmitting unit that transmits the image to the plotter device, and a first receiving unit that receives a control command transmitted from the image forming apparatus. The plotter device includes a second receiving unit that receives the image transmitted from the scanner device, a plotter unit that draws the image on a recording medium, and an abnormality detecting unit that detects an abnormality in the plotter unit. When the abnormality detecting unit detects an abnormality in the plotter unit, power supply to the original scanning unit is shut off, and a conveying speed of the original by the original conveying unit is set to be higher than another conveying speed when the original is scanned by the original scanning unit.

A computer program product includes a non-transitory computer-usable medium having a computer-readable program code embodied in the medium causing a computer to instruct an image forming apparatus to function as: an original conveying unit that conveys an original, an original scanning unit that scans the original conveyed by the original conveying unit so as to generate an image of the original, a plotter unit that draws the image on a recording medium, an abnormality detecting unit that detects an abnormality in the plotter unit, and a control unit. A function for shutting off power supply to the original scanning unit when the abnormality detecting unit detects an abnormality in the plotter unit and another function for setting a conveying speed of the original by the original conveying unit to be higher than another conveying speed when the original is scanned by the original scanning unit are realized in the control unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of a correspondence between a original scanning condition and an original conveying speed set by a speed setting unit;

FIG. 6 is a diagram illustrating an example of a correspondence between an original conveying speed during original scanning and an original conveying speed after switching;

FIG. 8 is a diagram illustrating power supply states in each units of the digital copying machine for each operation mode;

DETAILED DESCRIPTION OF THE PREFERRED EMBODIMENTS

The preferred embodiments of an image forming apparatus, an image forming system, and a computer program product will be described in detail with reference to the accompanying drawings. In the followings, the embodiments are applied to a large format-adaptive digital copying machine that can read or print an original in a large format by reading an image of the original using a sheet-through type scanning unit and by printing an image of the original on a sheet of roll paper using a plotter unit.

First Embodiment

Figure 1:
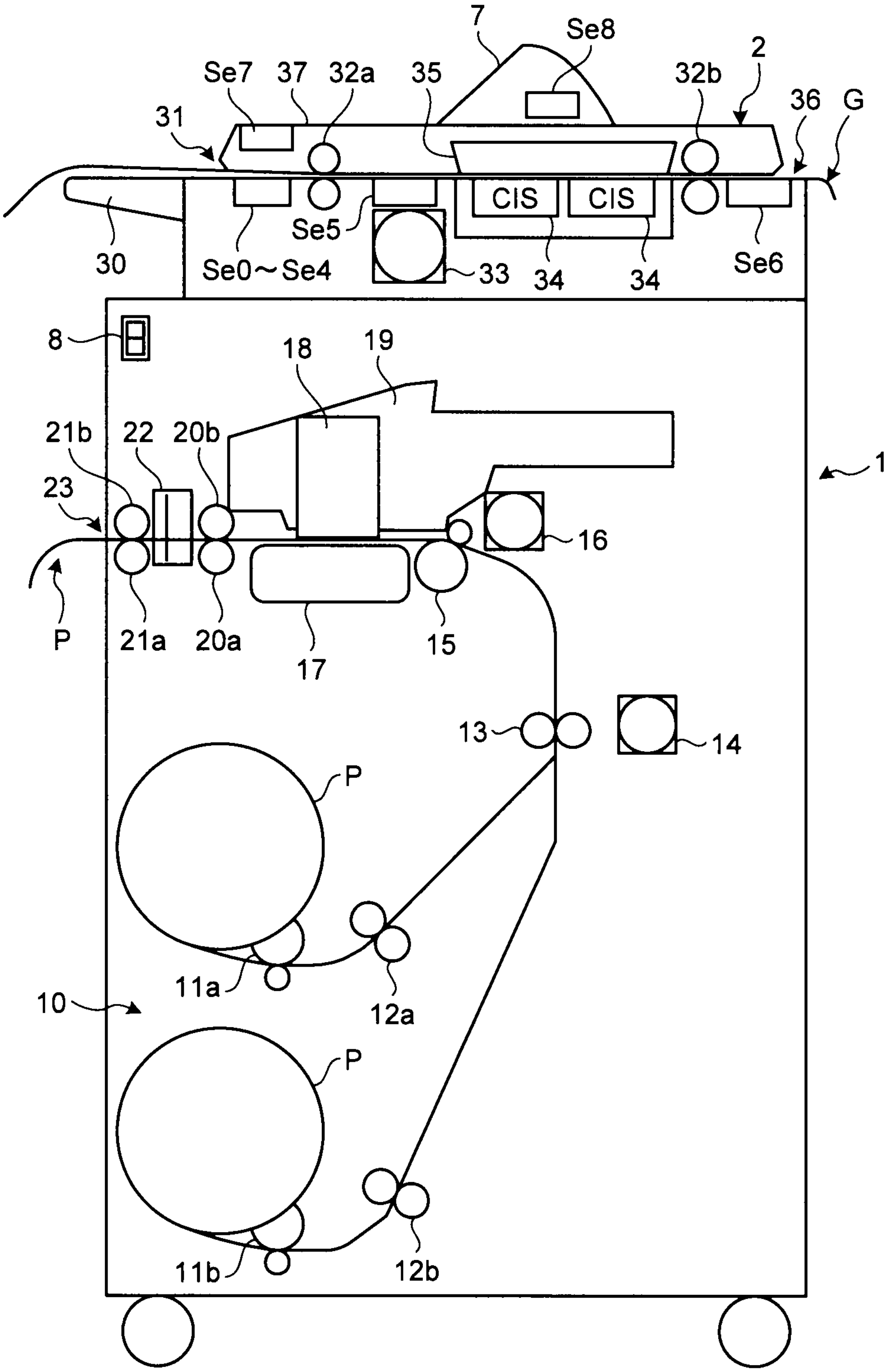
FIG. 1 is a side view schematically illustrating the overall configuration of a digital copying machine according to a first embodiment.

FIG. 1 is a side view schematically illustrating the overall configuration of a digital copying machine according to the first embodiment. As illustrated in FIG. 1, the digital copying machine according to the embodiment includes a plotter unit 1 and a scanning unit 2.

The plotter unit 1 includes a paper feeding unit 10. In the paper feeding unit 10, a plurality of paper rolls (sheets) P, paper feeding rollers 11*a*, 11*b*, 12*a*, 12*b*, and 13 that convey the sheet P, and a feeding motor 14 that drives the paper feeding rollers 11*a*, 11*b*, 12*a*, 12*b*, and 13. The sheet P is conveyed by the paper feeding rollers 11*a*, 11*b*, 12*a*, 12*b*, and 13, and is then conveyed to a platen plate 17 by a registration roller 15 that is driven by a registration motor 16.

The platen plate 17 has a plurality of through holes. A suction fan (not illustrated) is arranged below the platen plate 17 to suck the sheet P placed on the platen plate 17. The sheet P that has been conveyed to the platen plate 17 by the registration roller 15 is sucked onto the platen plate 17 by the suction fan through the through holes of the platen plate 17, so that the posture of the sheet P is maintained.

A carriage 19 with a head 18 for ejecting ink mounted thereon is arranged above the platen plate 17. The carriage 19 reciprocates along the main-scanning direction (the width direction of the sheet P) that is perpendicular to the sheet conveying direction of the sheet P. While the carriage 19 is stopped, the sheet P is conveyed in the sheet conveying direction (sub-scanning direction) by the registration roller 15 by an amount corresponding to a printing line of the head 18. While the carriage 19 moves in the main-scanning direction, ink is ejected from the head 18 toward the sheet P on the platen plate 17 on the basis of image data output from the scanning unit 2, thereby to draw an image on the sheet P.

The sheet P on which the image has been drawn is conveyed to a predetermined position by pairs of discharging rollers 20*a* and 20*b*; 21*a* and 21*b*, is cut by a cutter 22, and is discharged from a discharge aperture 23. Although not illustrated, a plurality of sensors for monitoring the state of the conveyed sheet P is provided in the sheet conveying path of the sheet P. With regard to an abnormality relating to the conveyance of the sheet P, such as a jam, the states of a plurality of sensors are monitored during the conveyance of the sheet P, and when these sensors do not show proper reactions, it can be determined that an abnormality has occurred.

The scanning unit 2 is a sheet-through type image reader in which an original G placed on an original table 30 is fed into the scanning unit 2 from an original insertion aperture 31, and while the original G is conveyed by original conveying rollers 32*a* and 32*b* that are driven by an original conveying motor 33, an image of the original G is read by a contact image sensor (hereinafter referred to as CIS) 34 provided in the sheet conveying path.

The original conveying roller 32*a* is arranged on the upstream side of the original G from the CIS 34 in the sheet conveying path, and the original conveying roller 32*b* is arranged on the downstream side of the original G from the CIS 34 in the sheet conveying path. An original pressing plate 35 is arranged at a position that faces an image reading surface of the CIS 34 to bring the conveyed original G into close contact with the image reading surface of the CIS 34.

Figure 2:
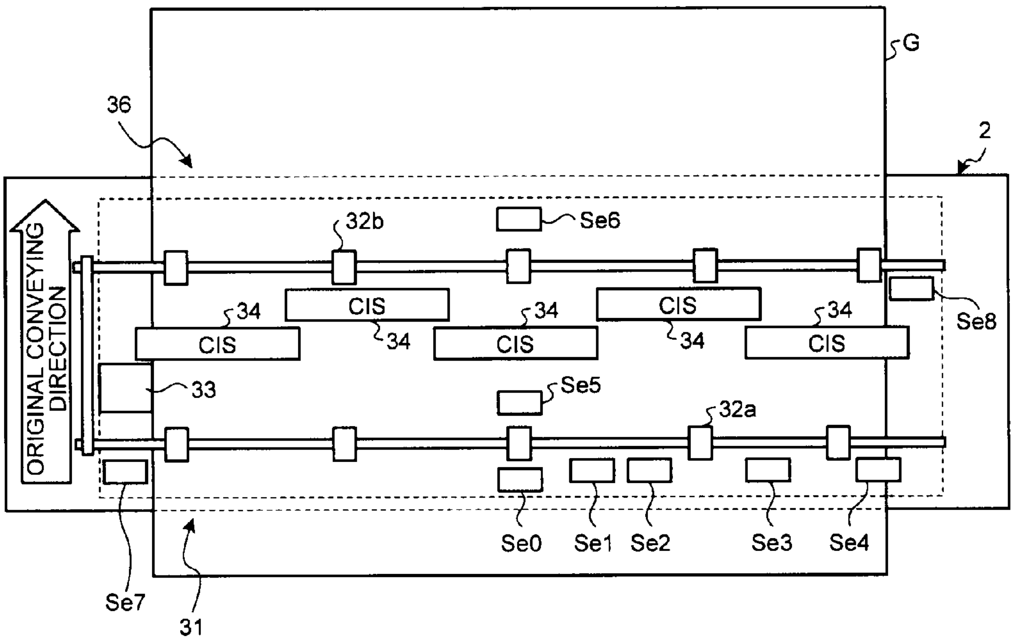
FIG. 2 is a plan view schematically illustrating a scanning unit in the digital copying machine, viewed from above, according to the first embodiment.

In the vicinity of the original inserting aperture 31, there are provided an original insertion sensor Se0 that detects the inserted original G and a plurality of original-size sensors Se1 to Se4 that detect the size of the original G. As illustrated in FIG. 2, the original insertion sensor Se0 is arranged substantially at the center when viewed from a front side of the digital copying machine, and the original size sensors Se1 to Se4 are sequentially arranged at an interval from the original insertion sensor Se0 to a side surface of the digital copying machine. FIG. 2 is a plan view schematically illustrating the scanning unit 2 viewed from above.

On the downstream side of the original insertion sensor Se0 in the sheet conveying path of the original G, an original registration sensor Se5 is provided to output a signal as the reference for the scanning timing of the original G. In the vicinity of an original discharging aperture 36 through which the original G is to be discharged to the outside of the scanning unit 2, an original discharging sensor Se6 is provided to detect that the original G has been discharged.

A document cover 37 that exposes or covers the image reading surface of the CIS 34 includes a cover open/close sensor Se7 that detects the open state and closed state of the document cover 37. In the vicinity of an operating unit 7 that is provided integrally with the document cover 37, there is provided an emergency stop key Se8 that stops feeding of the original G in an emergency case. A main switch 8 of the digital copying machine is arranged outside a housing that houses the plotter unit 1.

The original G placed on the original table 30 is taken into the scanning unit 2 from the original inserting aperture 31 and conveyed by the original conveying rollers 32*a* and 32*b* that are driven by the original conveying motor 33 so as to pass through the position that faces the image reading surface of the CIS 34. While the original G passes through the position that faces the image reading surface of the CIS 34, an image of the original G is optically read by the CIS 34. The original G after the image thereof has been read is discharged from the original discharging aperture 36.

At this time, the insertion of the original G is detected by the original insertion sensor Se0, and the discharging of the original G is detected by the original discharging sensor Se6. The size of the original G is detected by the original size sensors Se1 to Se4. When the leading edge of the original G reaches the position of the original registration sensor Se5, a signal which becomes the reference of the scanning timing of the original G performed by the CIS 34 is output from the original registration sensor Se5. An abnormality, such as a jam, that may occur while the original G is being scanned is detected when the sensors do not show proper reactions.

Figure 3:
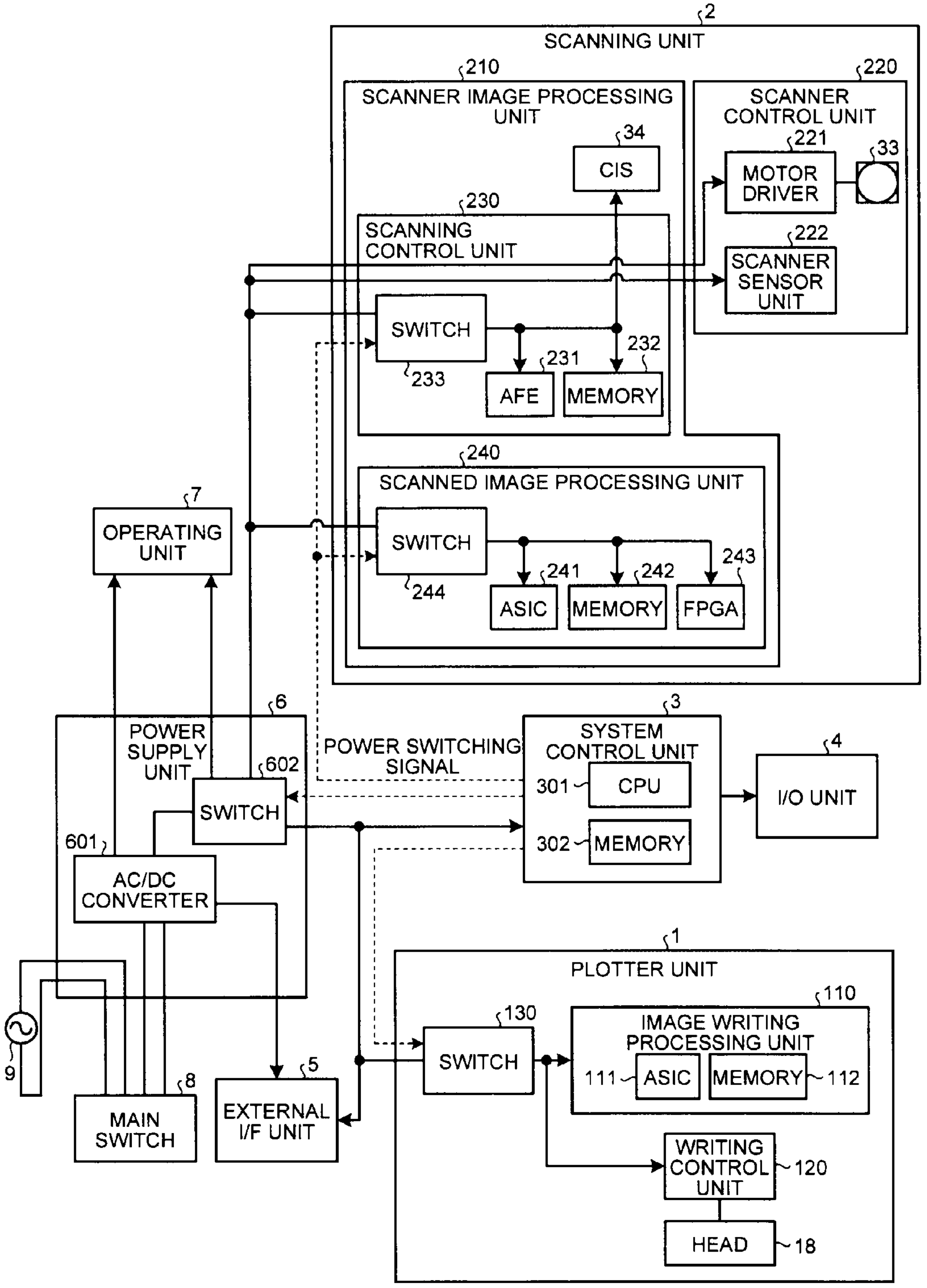
FIG. 3 is a block diagram illustrating a configuration of an electric circuit in a digital copying machine according to the first embodiment.

FIG. 3 is a block diagram illustrating a configuration of the electric circuit in the digital copying machine according to the embodiment. In particular, FIG. 3 is a diagram illustrating a power supplying path to each unit of the digital copying machine. In the drawing, the arrow-headed solid-lines show the power supplying paths to respective units.

As illustrated in FIG. 3, the digital copying machine of the embodiment includes, in addition to the plotter unit 1 and the scanning unit 2, a system control unit 3, and an I/O unit 4, an external I/F unit 5, a power supply unit 6, the operating unit 7, and the main switch 8 which are controlled by the system control unit 3.

Figure 4:
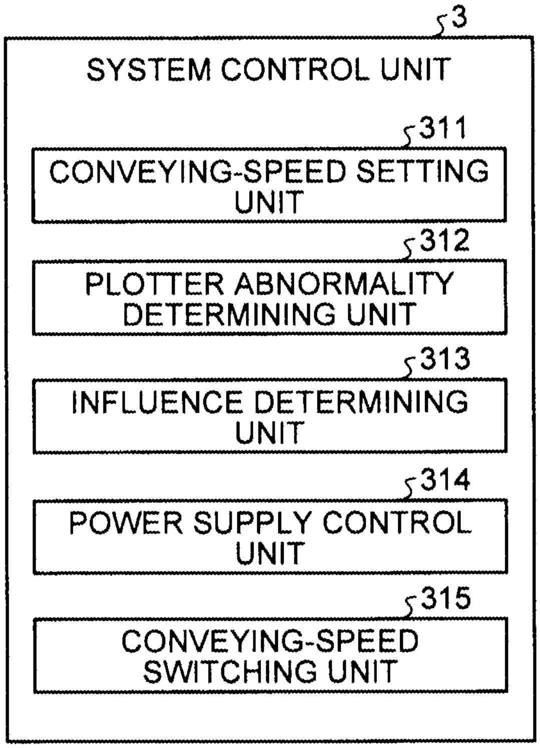
FIG. 4 is a functional block diagram illustrating the functional configuration of a system control unit according to the first embodiment.

The system control unit 3 is formed by a microcomputer having a CPU 301 and a memory 302. The CPU 301 executes a basic processing program as a digital copying machine by using a memory 302, thereby to control the operations of the respective units of the digital copying machine, such as the plotter unit 1, the scanning unit 2, the I/O unit 4, and the external I/F unit 5. In particular, in the digital copying machine of the embodiment, a control program that is configured to control the operation of the scanning unit 2 when an abnormality is detected in the plotter unit 1 is stored in the memory 302 of the system control unit 3. When the CPU 301 executes this control program, the functional configuration of a conveying-speed setting unit 311, a plotter abnormality determining unit 312, an influence determining unit 313, a power supply control unit 314, and a conveying-speed switching unit 315 are realized in the system control unit 3, as illustrated in FIG. 4.

The conveying-speed setting unit 311 sets an original conveying speed during scanning of the original G according to the scanning conditions of the original G by the scanning unit 2. FIG. 5 is a diagram illustrating an example of a correspondence between the scanning condition of the original G and the original conveying speed set by the conveying-speed setting unit 311. As illustrated in FIG. 5, as an example, the conveying-speed setting unit 311 sets the conveying speed of the original G to be lower in reading a color image than that in reading a monochrome image, and sets the conveying speed of the original G to be lower when reading magnification is high than that when reading magnification is low.

The plotter abnormality determining unit 312 determines whether or not an abnormality has occurred in the plotter unit 1 when the plotter unit 1 is in operation. Examples of an abnormality in the plotter unit 1 include an abnormality relating to the conveyance of the sheet P, an abnormality relating to an application specific integrated circuit (ASIC), which will be described below) that performs data processing for image writing, and the like. The ASIC performs the data processing of the image writing on the basis of a signal representing an effective writing period that is determined according to the type of the sheet P or the like. An abnormality relating to the ASIC corresponds to a case where the signal representing the effective writing period is not determined even if the writing timing is reached or a case where the signal representing the effective writing period is not turned off even after a predetermined time has elapsed. A case where the ASIC does not respond for a predetermined time when the plotter unit 1 is in operation also corresponds to an abnormality relating to the ASIC.

For example, with regard to an abnormality relating to feeding of the sheet P, the plotter abnormality determining unit 312 monitors the states of a plurality of sensors provided in the conveying path of the sheet P, and determines that an abnormality has occurred when the sensors do not show proper reactions. With regard to an abnormality relating to the ASIC, the plotter abnormality determining unit 312 determines that an abnormality has occurred by acquiring, from the ASIC, a signal that gives notification of an abnormality when the signal representing the effective writing period is not defined or when the signal representing the effective writing period is not turned off. When the plotter unit 1 cannot communicate with the ASIC for a predetermined time or more while the plotter unit 1 is in operation, the plotter abnormality determining unit 312 determines that an abnormality has occurred in the ASIC.

When the plotter abnormality determining unit 312 determines that an abnormality has occurred in the plotter unit 1, the influence determining unit 313 determines whether or not the abnormality in the plotter unit 1 affects an image (hereinafter, referred to as a scanned image) of the original G that is generated through scanning in the scanning unit 2. Specifically, for example, if an abnormality in the plotter unit 1 that has been determined by the plotter abnormality determining unit 312 to have occurred is an abnormality relating to the ASIC, the influence determining unit 313 determines that the abnormality in the plotter unit 1 is to affect the scanned image.

The power supply control unit 314 transmits a power switching signal to a switch 602 provided in the power supply unit 6, switches 233 and 244 provided in the scanning unit 2, and a switch 130 provided in the plotter unit 1 (indicated by arrow-headed broken-lines in FIG. 3), and controls the on/off of the switches 602, 233, 244, and 130, thereby to control power supply to the respective units of the digital copying machine. In particular, when the plotter abnormality determining unit 312 determines that an abnormality has occurred in the plotter unit 1, the power supply control unit 314 shuts off power supply to the plotter unit 1, and when the influence determining unit 313 determines that the abnormality in the plotter unit 1 affects the scanned image, further shuts of power supply to a scanner image processing unit 210 (to be described below) in the scanning unit 2, and allows power supply only to a scanner control unit 220 (to be described below).

When the plotter abnormality determining unit 312 determines that an abnormality has occurred in the plotter unit 1 and the influence determining unit 313 determines that the abnormality in the plotter unit 1 affects the scanned image, the conveying-speed switching unit 315 changes the conveying speed of the original G to a speed higher than a conveying speed of the original G during scanning. FIG. 6 is a diagram illustrating an example of a correspondence between the conveying speed of the original G during scanning and the conveying speed after switching. As illustrated in FIG. 6, when the plotter abnormality determining unit 312 determines that an abnormality has occurred in the plotter unit 1 and the influence determining unit 313 determines that the abnormality in the plotter unit 1 affects the scanned image, the conveying-speed setting unit 311 changes the conveying speed of the original G to a speed higher than the speed set by the conveying-speed setting unit 311, for example, to 180 mm/s. The conveying speed of the original G at this time is the speed such that the original G is not damaged, and may be arbitrarily changed to a speed higher than the conveying speed during scanning of the original G set by the conveying-speed setting unit 311.

The external I/F unit 5 illustrated in FIG. 3 is connected to an external device, such as a personal computer, a server, or the like. The external I/F unit 5 communicates with the external device under the control of the system control unit 3, thereby to transmit image data to and receive image data from the external device.

The power supply unit 6 includes an AC/DC converter 601 that rectifies an external commercial power supply 9 and adjusts the voltage thereof, thereby to generate a necessary voltage/current, and a switch 602 that is turned on/off in response to the power switching signal from the power supply control unit 314 of the system control unit 3. When the switch 602 is turned on, the power supply unit 6 supplies direct-current (DC) power generated by the AC/DC converter 601 to each of the plotter unit 1, the scanning unit 2, the system control unit 3, the external I/F unit 5, and the operating unit 7. If the switch 602 is turned off, the power supply unit 6 shuts off power supply to the respective units. Even if the switch 602 is turned off, the power supply unit 6 directly supplies DC power generated by the AC/DC converter 601 to a portion (at least the CPU 301) of the system control unit 3, the external I/F unit 5, and a portion (key for the main power supply) of the operating unit 7 without passing though the switch 602.

The operating unit 7 includes a key for the main power supply that is operated when a user uses the digital copying machine, and keys (numeric keys, a copy starting key, a mode setting key, and the like) that are used when the user directly inputs a command). A process corresponding to a command input from the operating unit 7 is performed by the system control unit 3.

The main switch 8 is a switch that switches between connection/disconnection of the power supply unit 6 of the digital copying machine and the external commercial power supply 9.

The plotter unit 1 includes the above-described head 18 that ejects ink to write an image, an image writing processing unit 110 that processes data of a written image by the head 18 under the control of the system control unit 3, and a writing control unit 120 that controls the head 18 so that written image data output from the image writing processing unit 110 is written onto the sheet P. The image writing processing unit 110 includes an ASIC 111 that performs data processing for image writing and a memory 112 that stores data necessary for the processing.

The scanning unit 2 includes, as a circuit configuration, a scanner image processing unit 210 (corresponding to "original scanning unit" described in the appended claims) and a scanner control unit 220.

The scanner image processing unit 210 is a portion of the scanning unit 2 that reads an image of the original G and performs processing of a scanned image. The scanner image processing unit 210 includes the above-described CIS 34 that optically reads an image of the original G, a scanning control unit 230, and a scanned image processing unit 240. A light-emitting diode (LED) is suitably used as illumination of the CIS 34.

The scanning control unit 230 includes an analog front-end (AFE) 231 and a memory 232. The AFE 231 converts analog image data read by the CIS 34 into digital image data that is output to the scanned image processing unit 240. The scanning control unit 230 also includes a switch 233 that is turned on/off in response to the power switching signal from the power supply control unit 314 of the system control unit 3. Power supply and shutoff from the power supply unit 6 to the AFE 231 and the memory 232 in the scanning control unit 230, and the CIS 34 are individually switched by the on/off of the switch 233.

The scanned image processing unit 240 includes an ASIC 241, a memory 242, a field programmable gate array (FPGA) 243, and the like. A predetermined image process is performed on an image read by the CIS 34, and the result is output to the plotter unit 1 as a scanned image. Similarly to the switch 233 included in the scanning control unit 230, the scanned image processing unit 240 includes a switch 244 that is turned on/off in response to the power switching signal from the power supply control unit 314 of the system control unit 3. Power supply and shutoff from the power supply unit 6 to the ASIC 241, the memory 242, and the FPGA 243 in the scanned image processing unit 240 is individually switched by the on/off of the switch 244.

The scanner control unit 220 is a part of the scanning unit 2 for performing conveyance control of the original G, abnormality detection, and the like. The scanner control unit 220 includes the above-described original conveying motor 33 (corresponding to "original conveying unit" described in the appended claims") that conveys the original G, a motor driver 221 that performs driving control of the original conveying motor 33, and a scanner sensor unit 222. The scanner sensor unit 222 is a collective term for the original insertion sensor Se0, the original size sensors Se1 to Se4, the original registration sensor Se5, the original discharging sensor Se6, the cover open/close sensor Se7, and the emergency stop key Se8.

As described above, in the digital copying machine of the embodiment, the scanner image processing unit 210 of the scanning unit 2 includes the switches 233 and 234 that are turned on/off in response to the power switching signal from the system control unit 3, such that power supply to the respective units in the scanner image processing unit 210 can be controlled by the on/off of the switches 233 and 244 separately from the scanner control unit 220. That is, if the switch 602 provided in the power supply unit 6 is turned on, power is supplied to the scanner control unit 220 of the scanning unit 2. By contrast, if the switches 233 and 244 are turned on, power is supplied to the scanner image processing unit 210, and if the switches 233 and 244 are turned off, power supply is shut off.

Although in the circuit configuration illustrated in FIG. 3, the switches 233 and 244 are respectively provided in the scanning control unit 230 and the scanned image processing unit 240 of the scanner image processing unit 210, these switches 233 and 244 may be integrated as a single switch. Furthermore, these switches 233 and 244 may be provided such that power supply to the scanner image processing unit 210 is individually switched (that is, separately from the scanner control unit 220), or may be provided outside the scanning unit 2, for example, in the power supply unit 6 or the like.

As described above, in the digital copying machine of the embodiment, the plotter unit 1 includes the switch 130 that is turned on/off in response to the power switching signal from the system control unit 3, and the power supply to the plotter unit 1 can be individually controlled by the on/off of the switch 130. That is, if the switch 602 provided in the power supply unit 6 is turned on, power is supplied to the scanning unit 2, the system control unit 3, the operating unit 7, and the like. Meanwhile, if the switch 130 is further turned on, power is supplied to the plotter unit 1, and if the switch 130 is turned off, the power supply is shut off.

Figure 7:
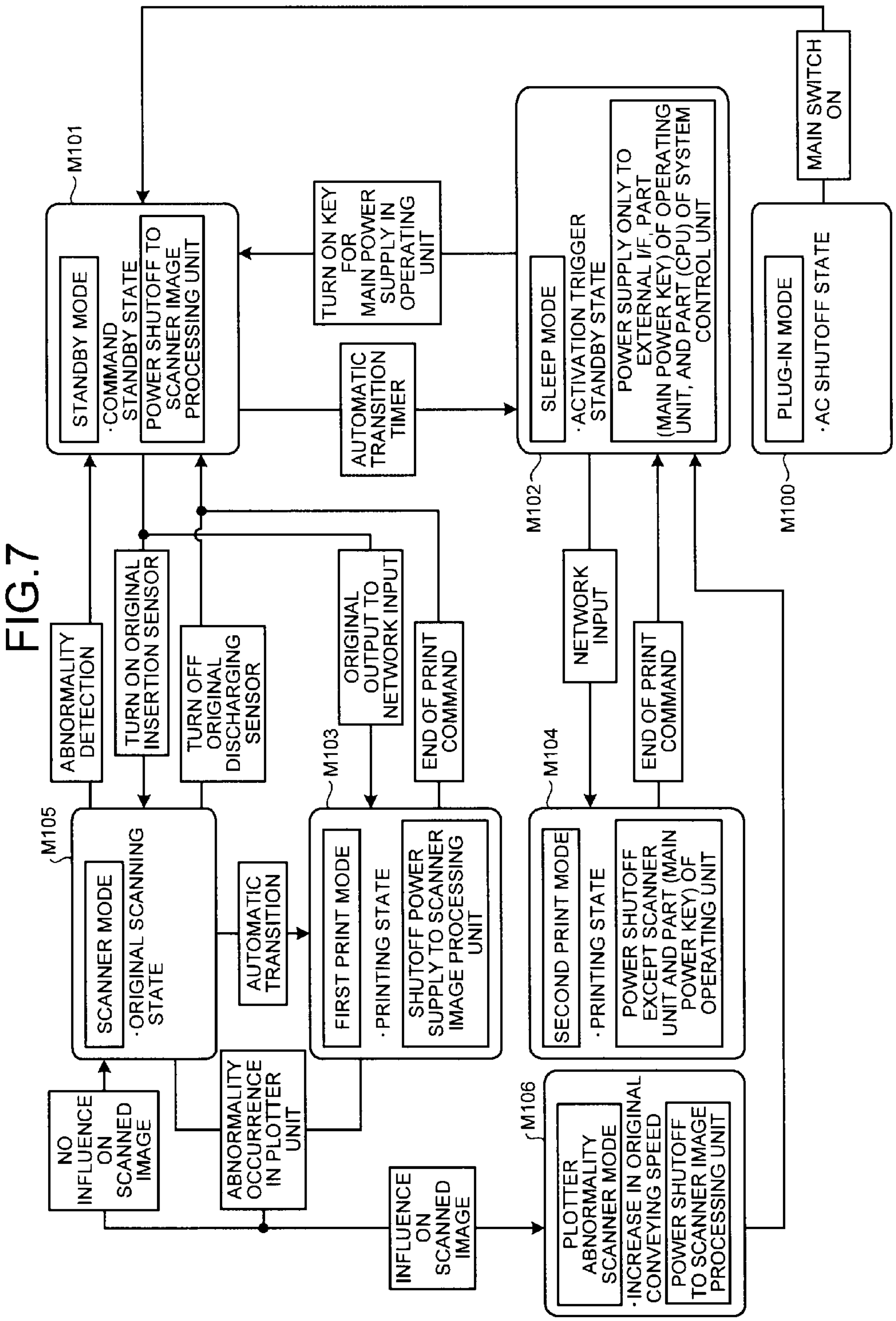
FIG. 7 is a state transition diagram illustrating transition of an operation mode in the digital copying machine according to the first embodiment.

FIG. 7 is a state transition diagram illustrating the transitions of operation modes in the digital copying machine of the embodiment. FIG. 8 is a diagram summarizing the power supply states to respective units of the digital copying machine in each operation mode. The outline of transition of the operation mode in the digital copying machine of the embodiment and a procedure of switching the power supply to the respective units will be described with reference to FIGS. 7 and 8.

In a plug-in mode (M100) in which a power cord is connected and the main switch 8 is turned off, power (AC power) supply to the entire digital copying machine is shut off. In this state, if the main switch 8 is turned on, power is supplied to the respective units of the digital copying machine, and the initialization of the scanning unit 2 is carried out.

If the initialization of the scanning unit 2 is completed, the switches 233 and 244 provided in the scanner image processing unit 210 are changed from on to off. Accordingly, power supply to the scanner image processing unit 210 is shut off, and the operation mode is changed to a standby mode (M101) that is a command standby state.

If a preset time elapses in the standby mode (M101) without an input of a command, the operation mode is automatically changed to a sleep mode (M102) that is an activation trigger standby state. In the sleep mode (M102), power is supplied only to a portion (CPU 301) of the system control unit 3, the external I/F unit 5, and a portion (key for the main power supply) of the operating unit 7. Power supply to other units is shut off by turning off the switch 602 provided in the power supply unit 6.

In the sleep mode (M102), if the key for the main power supply of the operating unit 7 is depressed, the operation mode is changed to the standby mode (M101). In addition, if the external I/F unit 5 receives a print command from an external device, such as a personal computer when the external I/F unit 5 is in the sleep mode (M102), the operation mode is changed to a second printing mode (M104), and printing is performed. In the second printing mode (M104), power is supplied to the plotter unit 1, the system control unit 3, and the external I/F unit 5, and power supply to the scanning unit 2 is shut off. With regard to the operating unit 7, power is supplied only to the key for the main power supply, and power supply to other units is shut off.

In the second printing mode (M104), if a print command is completed, the operation mode is automatically changed to the sleep mode (M102).

In the standby mode (M101), if the insertion of the original G is detected by the original insertion sensor Se0 of the scanning unit 2, the switches 233 and 244 provided in the scanner image processing unit 210 are changed from off to on, and power is supplied to the scanner image processing unit 210. The initialization of the scanning unit 2 is carried out, and if the initialization is completed, the operation mode is changed to a scanner mode (M105) in which scanning of the original G is performed. In the scanner mode (M105), power is applied to the entire digital copying machine.

In the standby mode (M101), if a command for instructing the digital copying machine to perform copying is input therein, the operation mode is changed to a first printing mode (M103) in which sequential printing is performed when the process of reading image data in the scanner mode (M105) is completed. In this case, when the scanning of the original G and the image processing are completed, the switches 233 and 244 provided in the scanner image processing unit 210 are changed from on to off, and power supply to the scanner image processing unit 210 is shut off. Printing output in the first printing mode (M103) is performed, and after the printing output has been completed, the operation mode is changed to the standby mode (M101).

In the scanner mode (M105), when any abnormality, such as a jam, is detected by the scanner sensor unit 222 during scanning of the original G, the switches 233 and 244 provided in the scanner image processing unit 210 are changed from on to off, power supply to the scanner image processing unit 210 is shut off, and the operation mode is changed to the standby mode (M101).

In the digital copying machine of the embodiment, it is possible to simultaneously perform scanning of the original G in the scanner mode (M105) and printing output in the first printing mode (M103) in parallel. This corresponds to a case in which, while scanning of a plurality of originals G and image processing are performed by the scanning unit 2, printing of the scanned images of the originals G subjected to the scanning and the image processing is performed by the plotter unit 1. In this case, even during printing in the first printing mode (M103), the scanning of the original G and the image processing are continued, so that power supply to the scanner image processing unit 210 is not shut off.

In this state, if an abnormality occurs in the plotter unit 1, the switch 130 provided in the plotter unit 1 is changed from on to off, and power supply to the plotter unit 1 is shut off, so that printing output in the first printing mode (M103) is completed. It is determined whether or not the abnormality in the plotter unit 1 affects the scanned image, and if it is determined that the abnormality in the plotter unit 1 does not affect a scanned image, the operation mode is changed to a mode in which only the scanner mode (M105) is active. The scanner mode (M105) at this time is in a state in which the power supply to the plotter unit 1 is shut off.

On the contrary, when it is determined that the abnormality in the plotter unit 1 affects the scanned image, the operation mode is changed to a plotter abnormality scanner mode (M106). In the plotter abnormality scanner mode (M106), the switches 233 and 244 provided in the scanner image processing unit 210 are changed from on to off, and the power supply to the scanner image processing unit 210 is shut off. In the plotter abnormality scanner mode (M106), the conveying speed of the original G by the original conveying motor 33 is changed to a speed higher than the original conveying speed during scanning in the scanner mode (M105). In this case, conveyance of the original G is conveyance for discharging the original G for which a scanning has been interrupted, and the original conveying speed is changed to a higher speed so as to discharge the original G quickly. If the discharging of the original G for which the scanning has been interrupted is completed, the operation mode is changed to the sleep mode (M102).

As described above, in the digital copying machine of the embodiment, when scanning of the original G in the scanner mode (M105) and printing output in the first printing mode (M103) are simultaneously performed in parallel, if it is determined that an abnormality has occurred in the plotter unit 1 and the abnormality in the plotter unit 1 affects the scanned image, the operation mode is changed to the plotter abnormality scanner mode (M106), in which the power supply to the plotter unit 1 is shut off and the power supply to the scanner image processing unit 210 of the scanning unit 2 is also shut off. Accordingly, it is possible to significantly reduce the power consumption. In the plotter abnormality scanner mode (M106), because power supply to the scanner control unit 220 continues, conveyance of the original G by the original conveying motor 33 can be continued, and the original G for which the scanning has been interrupted can be discharged to outside without a manual operation.

The conveying speed of the original G in the plotter abnormality scanner mode (M106) is changed to a speed higher than the conveying speed during scanning of the original G in the scanner mode (M105). Therefore, it is possible to discharge the original G for which the scanning has been interrupted quickly and to reduce the power consumption in the original conveying motor 33 when the original G is discharged.

Figure 9A:
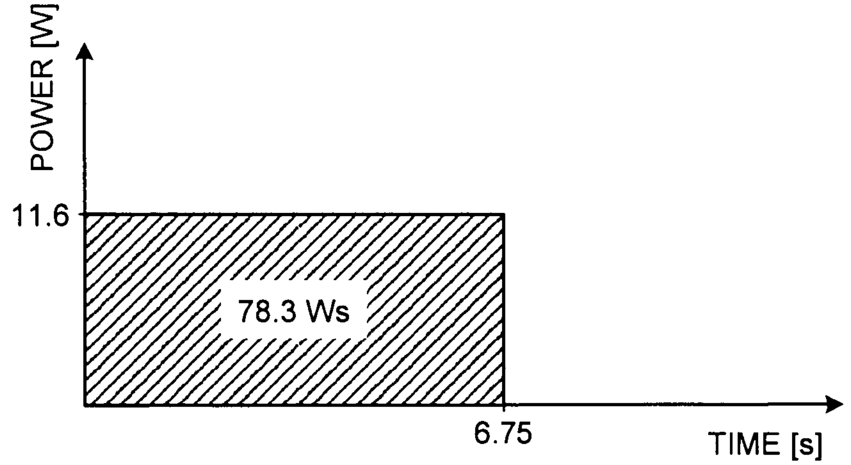
FIGS. 9A and 9B are diagrams comparatively illustrating power consumption in a original conveying motor when an original conveying speed in a plotter abnormality scanner mode is the same as an original conveying speed during original scanning and power consumption in the original conveying motor when the original conveying speed is changed to a higher speed than the original conveying speed during original scanning.
Figure 9B:
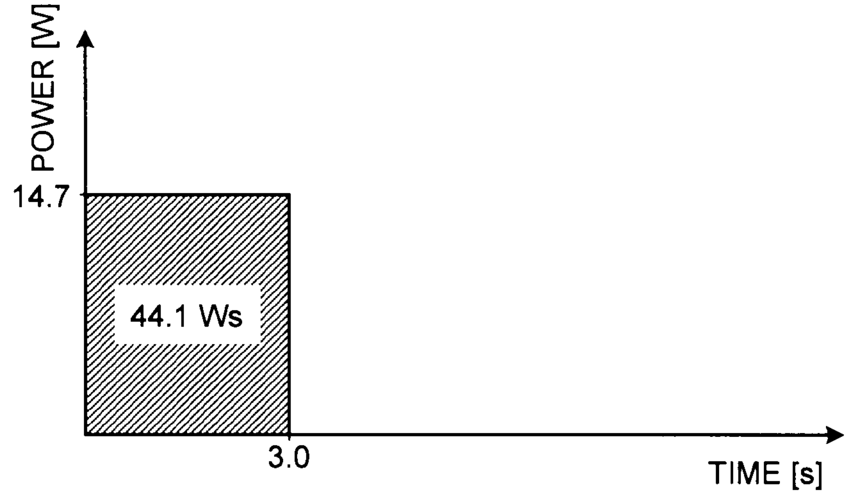

FIGS. 9A and 9B are diagrams comparatively illustrating the power consumption in the original conveying motor 33 when the conveying speed of the original G in the plotter abnormality scanner mode (M106) is assumed to be the same as the conveying speed during scanning of the original G in the scanner mode (M105) and the power consumption in the original conveying motor 33 when the conveying speed of the original G in the plotter abnormality scanner mode (M106) is changed to a speed higher than the conveying speed during scanning of the original G in the scanner mode (M105). In the example illustrated in FIGS. 9A and 9B, it is assumed that the conveying speed during scanning of the original G in the scanner mode (M105) is 80 mm/s, and the length of a not-yet-scanned portion of the original G in the conveying direction when an abnormality occurs in the plotter unit 1 is 540 mm. A graph of FIG. 9A illustrates a case where the conveying speed of the original G in the plotter abnormality scanner mode (M106) remains as 80 mm/s, and a graph of FIG. 9B illustrates a case where the conveying speed of the original G in the plotter abnormality scanner mode (M106) is changed to 180 mm/s.

As illustrated in FIG. 9A, when the conveying speed of the original G in the plotter abnormality scanner mode (M106) is assumed to remain as 80 mm/s, the average power consumption in the original conveying motor 33 is 11.6 W, and the conveyance time until the discharging of the original G is completed becomes 6.75 seconds. Accordingly, the amount (integral power) of power consumption of the original conveying motor 33 necessary for discharging the original G amounts to 78.3 Ws.

When the conveying speed of the original G in the plotter abnormality scanner mode (M106) is changed to 180 mm/s, the average power consumption in the original conveying motor 33 is 14.7 W, as illustrated in FIG. 9B, and the conveying time that is a time elapsed until the discharging of the original G is completed becomes 3.0 seconds. Accordingly, the amount of power consumption (integral power) of the original conveying motor 33 necessary for discharging the original G becomes 44.1 Ws. It is therefore understood that the power consumption in the original conveying motor 33 can be reduced compared to a case when the conveying speed of the original G is 80 mm/s.

Figure 10:
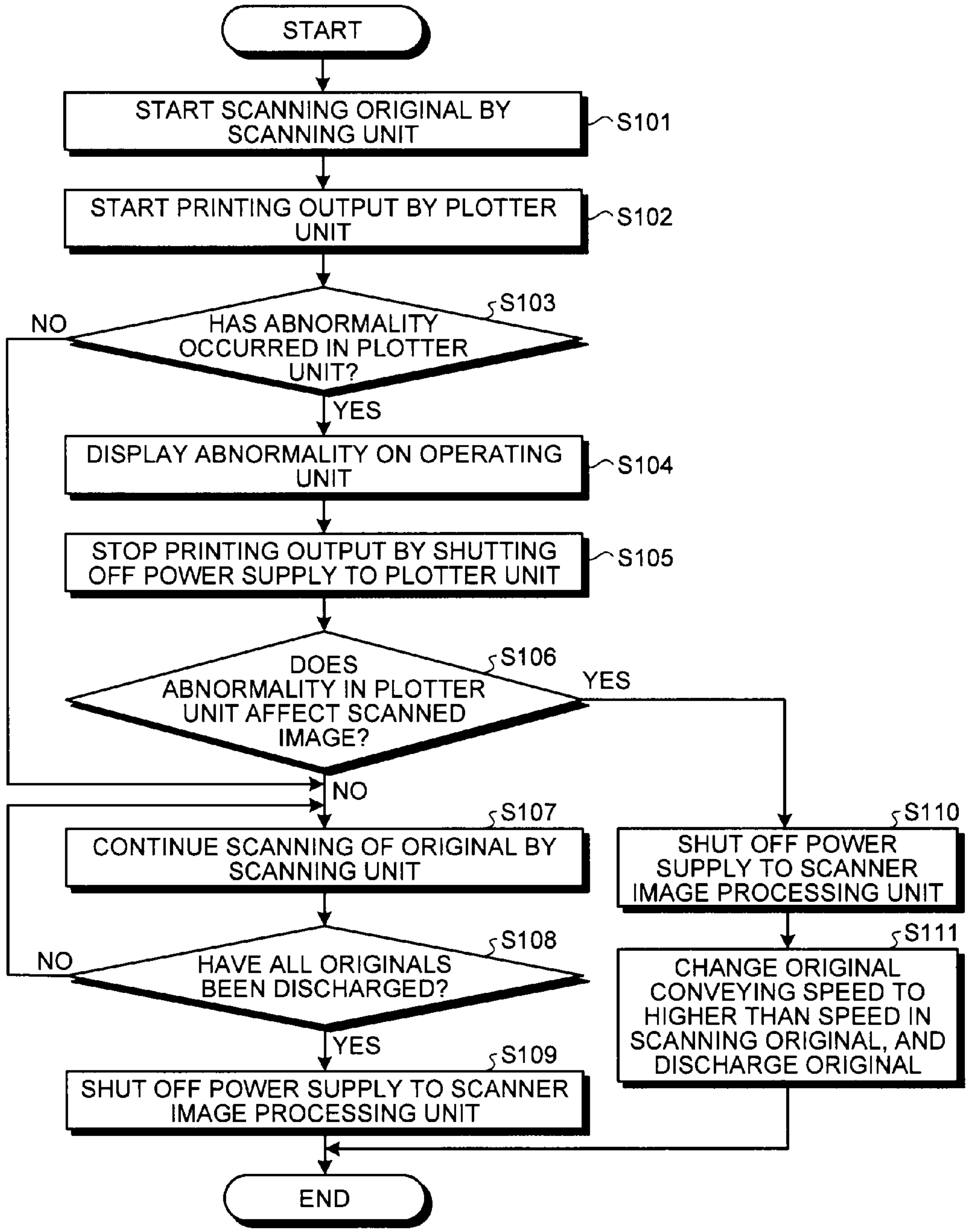
FIG. 10 is a flowchart illustrating the outline of an operation when original scanning in a scanner mode and printing output in a first printing mode are simultaneously performed in parallel in a digital copying machine according to the first embodiment.

Next, in the digital copying machine of the embodiment, the outline of an operation when scanning of the original G in the scanner mode (M105) and printing output in the first printing mode (M103) are simultaneously performed in parallel will be described with reference to a flowchart of FIG. 10 by focusing on an operation relating to the scanning unit 2. The following operation is performed under the control of the system control unit 3.

In the standby mode (M101), when an operator inputs a command that instructs to perform copying and inserts the original G into the scanning unit 2, and if the insertion of the original G is detected by the original insertion sensor Se0, power is supplied to the scanner image processing unit 210 and the operation mode thereof is changed to the scanner mode (M105), and accordingly, scanning of the original G by the scanning unit 2 is started in Step S101. At this time, the conveying speed of the original G by the original conveying motor 33 is set by the conveying-speed setting unit 311 of the system control unit 3 according to the scanning conditions of the original G.

Next, if the original G is scanned by the scanning unit 2 and a scanned image is generated, the operation in the first printing mode (M103) starts, and in Step S102, printing output by the plotter unit 1 is performed. During printing output by the plotter unit 1, in Step S103, the plotter abnormality determining unit 312 of the system control unit 3 determines whether or not an abnormality has occurred in the plotter unit 1.

When it is determined that an abnormality has occurred in the plotter unit 1 (Yes in Step S103), in Step S104, an abnormality state (for example, the content of the abnormality, such as the occurrence of a sheet jam and an abnormality occurrence position) is displayed on the operating unit 7. In Step S105, power supply to the plotter unit 1 is shut off by the power supply control unit 314 of the system control unit 3, and printing output by the plotter unit 1 is stopped.

Next, in Step S106, the influence determining unit 313 of the system control unit 3 determines whether or not the abnormality in the plotter unit 1 affects the scanned image, and when it is determined that the abnormality in the plotter unit 1 does not affect the scanned image (No in Step S106), in Step S107, scanning of the original G by the scanning unit 2 is continued in a state where printing output by the plotter unit 1 is stopped. In the determination step in Step S103, when it is determined that no abnormality has occurred in the plotter unit 1 (No in Step S103), the process sequence proceeds to Step S107, and the scanning of the original G by the scanning unit 2 is continued. In this case, however, printing output by the plotter unit 1 is also continued.

Thereafter, in Step S108, it is determined whether or not the discharging of all the originals G having been set on the scanning unit 2 by the operator has been completed. The determination on whether or not the discharging of all the originals G has been completed can be made on the basis of, for example, whether both the original insertion sensor Se0 and the original discharging sensor Se6 are turned off. That is, if the original G is discharged, the original discharging sensor Se6 is changed from on to off; however, when the next original G has been set, before the previous original G is discharged and the original discharging sensor Se6 is turned off, the next original G is inserted and the original insertion sensor Se0 is turned on. Accordingly, both the original insertion sensor Se0 and the original discharging sensor Se6 are turned off only when the last original G is discharged. Therefore, it is possible to determine whether or not the discharging of all the originals G having been set on the scanning unit 2 by the operator has been completed on the basis of whether or not both the original insertion sensor Se0 and the original discharging sensor Se6 are turned off.

When it is determined that the discharging of all the originals G set on the scanning unit 2 by the operator has not been completed (No in Step S108), the process returns to Step S107 and scanning of the original G by the scanning unit 2 is continued. On the contrary, when it is determined that the discharging of all the originals G set on the scanning unit 2 by the operator has been completed (Yes in Step S108), in Step S109, the power supply to the scanner image processing unit 210 is shut off by the power supply control unit 314 of the system control unit 3, and the process sequence ends.

In the determination in Step S106, when it is determined that the abnormality in the plotter unit 1 affects the scanned image (Yes in Step S106), first, in Step S110, power supply to the scanner image processing unit 210 is shut off by the power supply control unit 314 of the system control unit 3. In Step S111, the conveying-speed switching unit 315 of the system control unit 3 changes the conveying speed of the original G by the original conveying motor 33 to a speed higher than the original conveying speed during scanning having been set by the conveying-speed setting unit 311. If the original G for which the scanning has been interrupted is conveyed at the original conveying speed after switching and discharged (original discharging sensor Se6 is turned off), the driving of the original conveying motor 33 is stopped, and the process sequence ends.

As described above in detail by using a specific example, according to the digital copying machine of the embodiment, when an abnormality occurs in the plotter unit 1, both the power supply to the scanner image processing unit 210 of the scanning unit 2 and the power supply to the plotter unit 1 are shut off, thereby significantly reducing power consumption. Simultaneously, the conveying speed of the original G by the original conveying motor 33 is changed to a speed higher than that during scanning, and the conveyance of the original G is continued, so that the original G for which the scanning has been interrupted can be discharged to outside quickly without a manual operation and saving the effort of removing the original G. The conveying speed of the original G during discharging thereof increases, thereby reducing power consumption necessary for discharging the original G.

In the digital copying machine of the embodiment, the above-described control of the scanning unit 2 is performed only when it is determined that an abnormality has occurred in the plotter unit 1 and the abnormality in the plotter unit 1 affects the scanned image. Accordingly, even if an abnormality occurs in the plotter unit 1, when the abnormality in the plotter unit 1 does not affect the scanned image, it is possible to continue the operation to scan the original G by the scanning unit 2, and to avoid unnecessary interruption of an operation in the scanning unit 2.

Second Embodiment

Next, a digital copying machine of a second embodiment will be described. The digital copying machine of the embodiment compares the discharged length (the length in the conveying direction of a first portion having been scanned) of an original G in a scanning interrupted state with the not-yet-inserted length (the length in the conveying direction of a second portion that has not yet been scanned) of the original G in the scanning interrupted state when an abnormality occurs in a plotter unit 1 and the power supply to the scanner image processing unit 210 of a scanning unit 2 is shut off. When the discharged length is longer than the not-yet-inserted length, the original G in the scanning interrupted state is conveyed in the same direction as that during scanning and discharged to outside. When the discharged length is shorter than the not-yet-inserted length, the original G in the scanning interrupted state is conveyed in the direction opposite to the conveying direction during scanning and discharged to outside. The basic configuration of the digital copying machine and the outline of the process thereof are the same as those in the first embodiment. Therefore, the same portions as those in the first embodiment are denoted by the same reference numerals, and the repeated description will be omitted. Only the portions characteristic of the present embodiment will be described.

Figure 11:
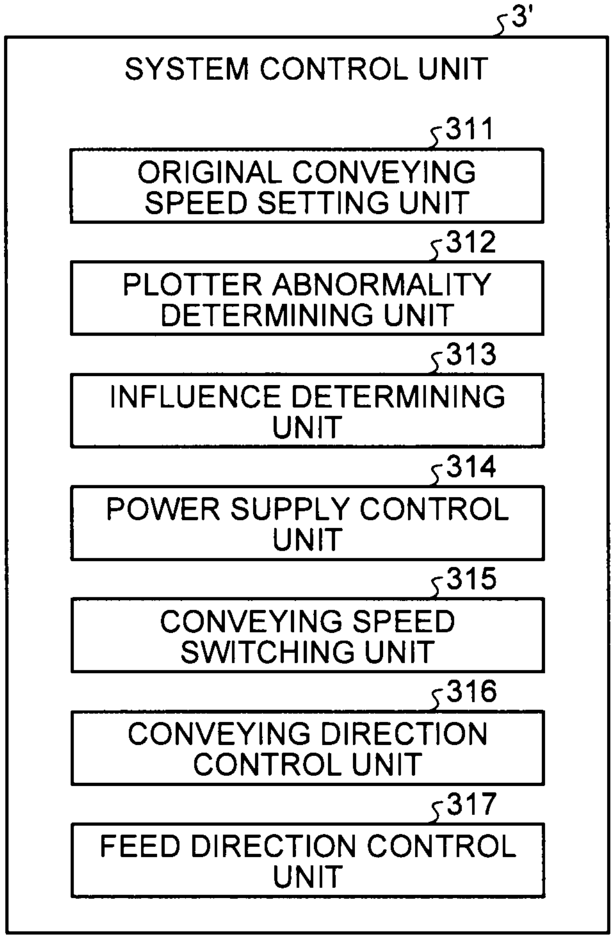
FIG. 11 is a functional block diagram illustrating the functional configuration of a system control unit according to a second embodiment.

FIG. 11 is a functional block diagram illustrating the functional configuration of a system control unit 3' of the embodiment. Similarly to the first embodiment, the functional configuration illustrated in FIG. 11 is realized as the function of the system control unit 3' when the CPU 301 executes the control program stored in the memory 302. In this case, a comparing unit 316 and a conveying direction control unit 317 are additionally provided to the functional configuration (see FIG. 4) of the system control unit 3 in the first embodiment.

The comparing unit 316 calculates, when an abnormality occurs in the plotter unit 1 and power supply to the scanner image processing unit 210 of the scanning unit 2 is shut off, a discharge length L1 that is the length of a scanned portion of the original G in the conveying direction at a time when the scanning of the original G is interrupted and an not-yet-inserted length L2 that is the length of a not-yet scanned portion of the original G at the time, and compares the discharged length L1 and the not-yet-inserted length L2.

Figure 12:
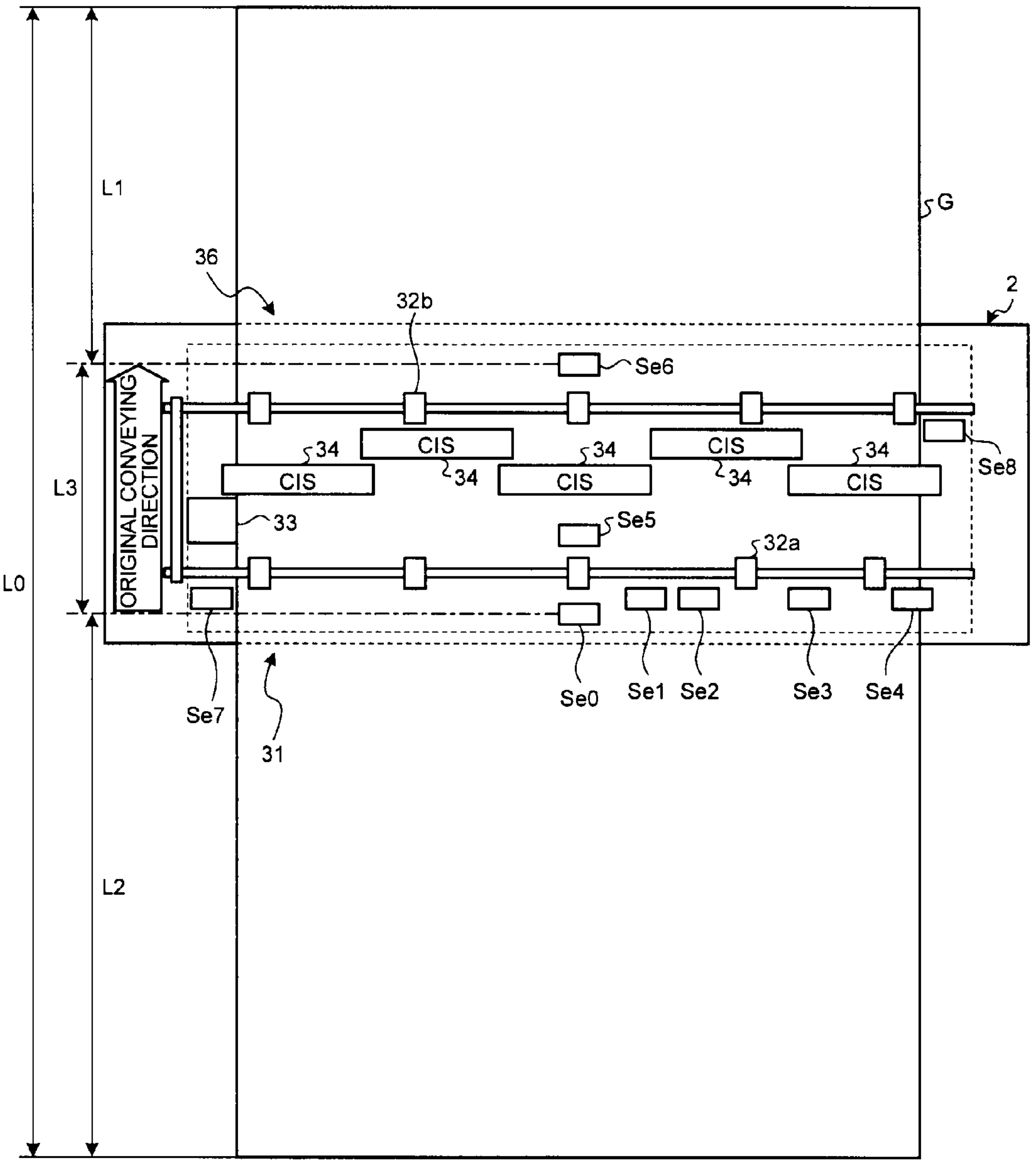
FIG. 12 is an explanatory diagram illustrating an example of a method for calculating a discharged length of a original and a length that has not been inserted yet of the original when a scanning process for the original is interrupted.

FIG. 12 is a diagram illustrating an example of a method for calculating the discharged length L1 and the not-yet-inserted length L2 in the comparing unit 316.

The discharged length L1 can be calculated on the basis of the conveying speed during scanning of the original G and the elapsed time since when the original discharging sensor Se6 is changed from off to on until scanning of the original G is interrupted. That is, because the original discharging sensor Se6 is changed from off to on when the leading edge of the original G passes through the position of the original discharging sensor Se6, the discharged length L1 is given by a multiplication of the original conveying speed and the elapsed time from the passage of the leading edge of the original G through the position of the original discharging sensor Se6 to the interruption of the subsequent scanning. For example, if the conveying speed during scanning of the original G is 80 mm/s, and the elapsed time is 3.86 seconds, the discharged length L1 is given by 3.86 s×80 mm/s=308.8 mm.

The not-yet-inserted length L2 can be calculated from the full length L0 of the original G that is being scanned, the distance L3 between the original insertion sensor Se0 and the original discharging sensor Se6, and the discharged length L1. The full length L0 of the original G can be acquired by a setting input of the operator using an operating unit 7, and the distance L3 between the original insertion sensor Se0 and the original discharging sensor Se6 is a known value specific to the digital copying machine. The discharged length L1 can be calculated in the above-described manner. Then, the subtraction of the distance L3 between the original insertion sensor Se0 and the original discharging sensor Se6 and the discharged length L1 from the full length L0 of the original G provides the not-yet-inserted length L2. For example, if the full length L0 of the original G is 1189 mm, the distance L3 between the original insertion sensor Se0 and the original discharging sensor Se6 is 142.5 mm, and the discharged length L1 is 308.8 mm, the not-yet-inserted length L2 is given by 1189 mm−142.5 mm−308.8 mm=737.7 mm.

The conveying direction control unit 317 controls the conveying direction when discharging the original G in the scanning interrupted state on the basis of the comparison result of the discharged length L1 and the not-yet-inserted length L2 by the comparing unit 316. That is, when the comparison result by the comparing unit 316 is found that the discharged length L1 is longer than the not-yet-inserted length L2, the conveying direction control unit 317 controls the conveying direction of the original G by the original conveying motor 33 such that the original G in the scanning interrupted state is conveyed in the same direction as that during scanning and is discharged to outside. On the contrary, when the comparison result by the comparing unit 316 is found that the discharged length L1 is shorter than the not-yet-inserted length L2, the conveying direction control unit 317 controls the conveying direction of the original G by the original conveying motor 33 such that the original G in the scanning interrupted state is conveyed in the direction opposite to the conveying direction during scanning and is discharged to outside.

In the example described with reference to FIG. 12, the discharged length L1 is 308.8 mm, the not-yet-inserted length L2 is 737.7 mm, and the discharged length L1 is shorter than the not-yet-inserted length L2. Accordingly, the conveying direction control unit 317 controls the conveying direction of the original G by the original conveying motor 33 so that the original G in the scanning interrupted state is conveyed in the direction opposite to the conveying direction during scanning and is discharged to outside.

Figure 13:
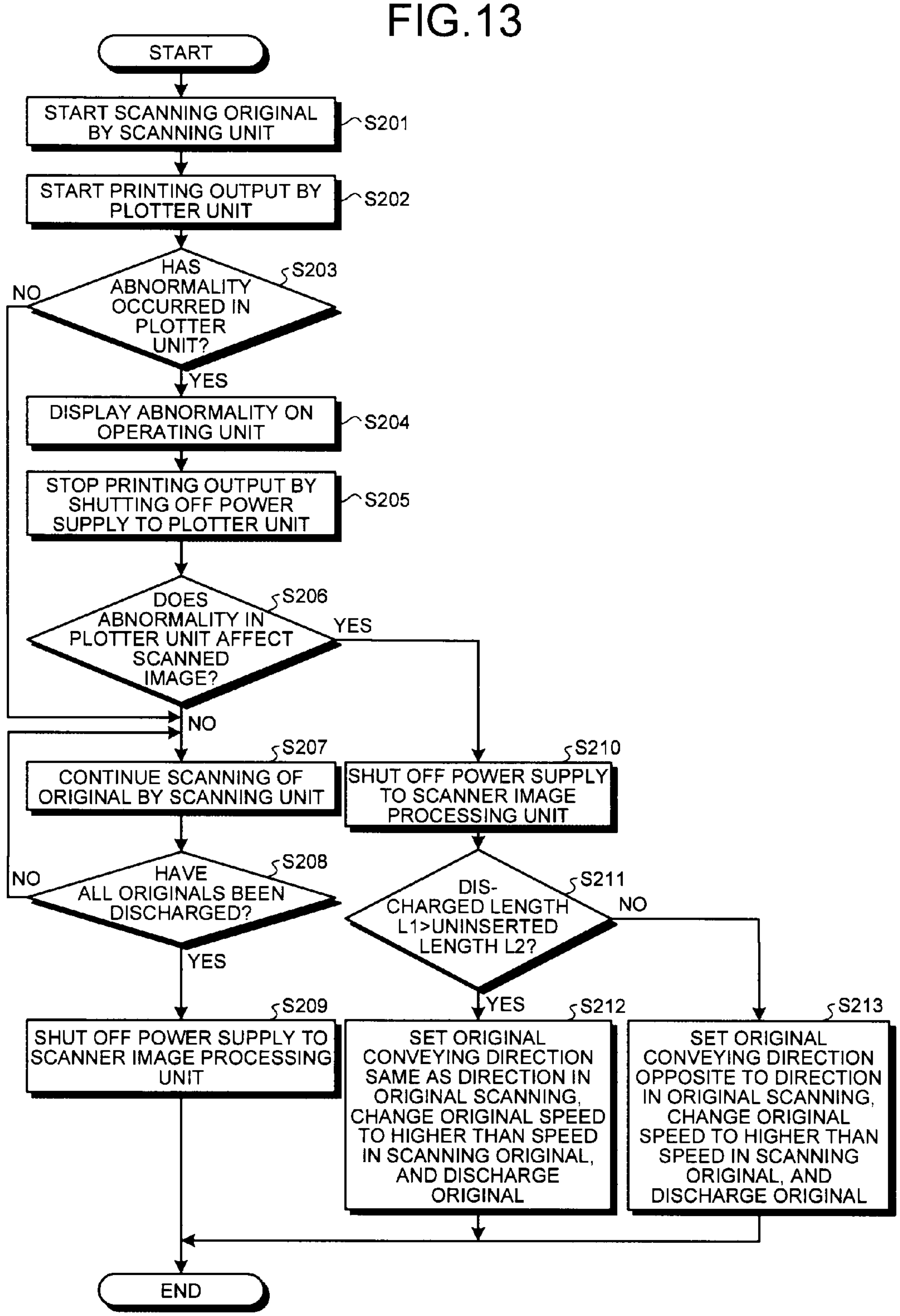
FIG. 13 is a flowchart illustrating the outline of an operation when original scanning in a scanner mode and printing output in the first printing mode are simultaneously performed in parallel in a digital copying machine according to the second embodiment.

FIG. 13 is a flowchart illustrating the outline of an operation when scanning of the original G in the scanner mode (M105) and printing output in the first printing mode (M103) are simultaneously performed in parallel in the digital copying machine of the embodiment. In the flowchart of FIG. 13, the process sequence from Step S201 to Step S210 is the same as the process sequence from Step S101 to Step S110 in the flowchart of FIG. 10, and hence, description thereof will not be repeated.

In the digital copying machine of the embodiment, in Step S210, if the power supply control unit 314 of the system control unit 3' shuts off power supply to the scanner image processing unit 210, in Step S211, the comparing unit 316 of the system control unit 3' calculates the discharged length L1 that is the length of a scanned portion of the original G in the conveying direction and the not-yet-inserted length L2 that is the length of a not-yet scanned portion of the original G, and compares the discharged length L1 and the not-yet-inserted length L2.

When the discharged length L1 is longer than the not-yet-inserted length L2 (Yes in Step S211), in Step S212, the conveying direction control unit 317 of the system control unit 3' sets the conveying direction of the original G by the original conveying motor 33 in the same direction as that during scanning, and the conveying-speed switching unit 315 of the system control unit 3' changes the conveying speed of the original G by the original conveying motor 33 to a speed higher than the original conveying speed during scanning having been set by the conveying-speed setting unit 311. The original G in the scanning interrupted state is conveyed in the same direction as that during scanning of the original G at the conveying speed that is set after the changing. If the original G is discharged (original discharging sensor Se6 is turned off), the driving of the original conveying motor 33 is stopped, and a process sequence ends.

When the discharged length L1 is shorter than the not-yet-inserted length L2 (No in Step S211), in Step S213, the conveying direction control unit 317 of the system control unit 3' sets the conveying direction of the original G by the original conveying motor 33 in the direction opposite to the conveying direction during scanning, and the conveying-speed switching unit 315 of the system control unit 3' changes the conveying speed of the original G driven by the original conveying motor 33 to a speed higher than the original conveying speed during scanning having been set by the conveying-speed setting unit 311. The original G in the scanning interrupted state is conveyed in the direction opposite to the conveying direction during scanning at the conveying speed after the changing. If the original G is discharged (original discharging sensor is turned Se6 off), the driving of the original conveying motor 33 is stopped, and a process sequence ends.

As described above, in the digital copying machine of the embodiment, when an abnormality occurs in the plotter unit 1 and the power supply to the scanner image processing unit 210 of the scanning unit 2 is shut off, the discharged length L1 of the original G in the scanning interrupted state is compared with the not-yet-inserted length L2 of the original G in the scanning interrupted state. When the discharged length L1 is longer than the not-yet-inserted length L2, the original G in the scanning interrupted state is conveyed in the same direction as that during scanning and is discharged to outside. When the discharged length L1 is shorter than the not-yet-inserted length L2, the original G in the scanning interrupted state is conveyed in the direction opposite to the conveying direction during scanning and discharged to outside. Therefore, according to the digital copying machine of the embodiment, the original G in the scanning interrupted state can be efficiently discharged compared to the first embodiment, thereby achieving further reduction in power consumption.

In the digital copying machine of each of the first and second embodiments, the above-described operation control of the scanning unit 2 when an abnormality is detected in the plotter unit 1 is realized, for example, when the CPU 301 of the system control unit 3 (system control unit 3') executes the control program that is provided embedded in a computer program product in advance. The control program that is executed by the digital copying machine of each of the first and second embodiments may be provided by being recorded in a computer-readable recording medium, such as a CD-ROM, a flexible disk (FD), a CD-R, or a Digital Versatile Disk (DVD), as files in an installable format or executable format.

The control program that is executed by the digital copying machine of each of the first and second embodiments may be configured to be stored in a computer connected to a network, such as the Internet, and may be provided by being downloaded through the network. Furthermore, the control program that is executed by the digital copying machine of each of the first and second embodiments may be provided or distributed through a network, such as the Internet.

The invention is not limited to the foregoing embodiments, and in an execution process, the components may be modified and embodied within the scope of the embodiments without departing from the subject matter of the invention. For example, although in the foregoing embodiments, an example has been described where the invention is applied to the large format-adaptive digital copying machine in which the image of the original G is read by the sheet-through type scanning unit 2, and the image of the original G is printed on rolled paper (sheet) P by the plotter unit 1, the invention is not limited to the digital copying machine described in the foregoing embodiments, and may be widely applied to all types of image forming apparatuses that perform scanning of an original image and printing output (drawing of a scanned image on a sheet).

Although in the foregoing embodiments, an example has been described where the invention is applied to the digital copying machine that is the single image forming apparatus including the plotter unit 1 and the scanning unit 2, the invention may be effectively applied to an image forming system that includes a plotter device with a separated function as the plotter unit 1 and a scanner device with a separated function as the scanning unit 2 such that the plotter device and the scanner device are communicably connected to each other.

When the invention is applied to the above-described image forming system, a scanned image generated by the scanner device is transmitted to the plotter device through communication. Accordingly, the scanner device includes a function (first transmitting unit) for transmitting the scanned image to the plotter device, and the plotter device includes a function (second receiving unit) for receiving the scanned image from the scanner device.

When the plotter device has the function corresponding to the system control unit 3 (system control unit 3'), it is necessary to transmit a control command for controlling the conveying speed of the original G from the plotter device to the scanner device through communication. Accordingly, the plotter device may be provided with a function (second transmitting unit) of transmitting the control command for controlling the conveying speed of the original G to the scanner device, and the scanner device may be provided with a function (first receiving unit) of receiving the control command from the plotter device.

When the scanner device has the function corresponding to the system control unit 3 (system control unit 3'), it is necessary to transmit an abnormality signal that gives notification of an abnormality from the plotter device to the scanner device. Accordingly, the plotter device may be provided with a function (second transmitting unit) for transmitting the abnormality signal that gives notification of an abnormality to the scanner device, and the scanner device may be provided with a function (first receiving unit) for receiving the abnormality signal from the plotter device.

According to the embodiments, when an abnormality is detected in the plotter unit, power supply to the original scanning unit is shut off, and the conveying speed of an original by the original conveying unit is set to be higher than the conveying speed when original scanning is performed by the original scanning unit, thereby saving time-consuming work of removing the original while achieving reduction in power consumption.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising: an original conveying unit that conveys an original;

an original scanning unit that scans the original conveyed by the original conveying unit at a first conveying speed to generate an image of the original;

a plotter unit that draws the image on a recording medium;

an abnormality detecting unit that detects abnormalities in the plotter unit; and a control unit that controls the original conveying unit to discharge the original at the first conveying speed, wherein the control unit determines the abnormality detecting unit has detected an abnormality in the plotter unit, shuts off a first power supply to the original scanning unit, sets a second conveying speed of the original by the original conveying unit to be higher than the first conveying speed for when the original is scanned by the original scanning unit, and controls the original conveying unit to discharge the original more quickly at the second conveying speed.

2. The image forming apparatus according to claim 1, further comprising a determining unit that determines whether or not the abnormality in the plotter unit affects the image, wherein the control unit determines the abnormality detecting unit has detected the abnormality in the plotter unit and the determining unit has determined that the abnormality affects the image, and the control unit shuts off the first power supply to the original scanning unit and sets the second conveying speed of the original by the original conveying unit to be higher than the first conveying speed for when the original is scanned by the original scanning unit.

3. The image forming apparatus according to claim 1, further comprising:

a comparing unit that, for an original for which scanning has been interrupted by a shutting off of the first power supply to the original scanning unit, compares a first length in a conveying direction of a first portion of the original that has been scanned with a second length in the conveying direction of a second portion of the original that has not yet been scanned, wherein the control unit controls a conveying direction of the original by the original conveying unit such that, when the first length of the first portion in the conveying direction is longer than the second length of the second portion in the conveying direction, the conveying direction of the original by the original conveying unit is set to be the same as the conveying direction of the original during scanning thereof by the original scanning unit, and when the first length of the first portion in the conveying direction is shorter than the second length of the second portion in the conveying direction, the conveying direction of the original by the original conveying unit is set to be opposite to the conveying direction of the original during scanning thereof by the original scanning unit, and sets the first conveying speed of the original by the original conveying unit to be higher than the second conveying speed when the original is scanned by the original scanning unit.

4. The image forming apparatus according to claim 1, wherein the control unit determines the abnormality detecting unit has detected the abnormality in the plotter unit and shuts off a second power supply to the plotter unit in addition to shutting off the first power supply to the original scanning unit.

5. The image forming apparatus according to claim 1, wherein the first conveying speed is set by the control unit according to an original scanning condition, and wherein the control unit determines the abnormality detecting unit has detected the abnormality in the plotter unit and sets the second conveying speed of the original by the original conveying unit to be higher than the first conveying speed as set by the control unit.

6. The image forming apparatus according to claim 1, further comprising:

a switch that independently switches a power supply state of the original scanning unit, wherein the control unit determines the abnormality detecting unit has detected the abnormality in the plotter unit, and turns off the switch to shut off the first power supply to the original scanning unit.

7. The image forming apparatus according to claim 1, further comprising a comparing unit that compares a first length of a first portion of the original that has been scanned with a second length of a second portion of the original that has not yet been scanned, wherein the control unit determines a scanning of the original has been interrupted by a shutting off of the first power supply to the original scanning unit and sets a conveying direction of the original by the original conveying unit based on a comparison by the comparing unit.

8. The image forming apparatus according to claim 7, wherein the control unit determines the first length is longer than the second length based on the comparison and sets the conveying direction to be the same as a conveying direction when the original is scanned by the original scanning unit, and wherein the control unit controls the original conveying unit to discharge the original in the conveying direction at the second conveying speed.

9. The image forming apparatus according to claim 7, wherein the control unit determines the first length is shorter than the second length based on the comparison and sets the conveying direction to be opposite to a conveying direction when the original is scanned by the original scanning unit, and wherein the control unit controls the original conveying unit to discharge the original in the conveying direction at the second conveying speed.

10. An image forming system including a scanner device and a plotter device that is communicably connected to the scanner device, wherein the scanner device includes:

an original conveying unit that conveys an original, an original scanning unit that scans the original conveyed by the original conveying unit at a first conveying speed to generate an image of the original, a first transmitting unit that transmits the image to the plotter device, and a first receiving unit that receives a control command transmitted from the image forming apparatus, wherein the plotter device includes:

a second receiving unit that receives the image transmitted from the scanner device, a plotter unit that draws the image on a recording medium, and an abnormality detecting unit that detects abnormalities in the plotter unit, wherein the original conveying unit is controlled to discharge the original at the first conveying speed; and wherein the abnormality detecting unit detects an abnormality in the plotter unit and:

a power supply to the original scanning unit is shut off, a second conveying speed of the original by the original conveying unit is set to be higher than the first conveying speed for when the original is scanned by the original scanning unit, and the original conveying unit is controlled to discharge the original more quickly at the second conveying speed.

11. A computer program product comprising a non-transitory computer-usable medium having a computer-readable program code embodied in the medium causing a computer to instruct an image forming apparatus to function as: an original conveying unit that conveys an original, an original scanning unit that scans the original conveyed by the original conveying unit at a first conveying speed so as to generate an image of the original, a plotter unit that draws the image on a recording medium, an abnormality detecting unit that detects abnormalities in the plotter unit, and a control unit that controls the original conveying unit to discharge the original at the first conveying speed, wherein a function for determining the abnormality detecting unit has detected an abnormality in the plotter unit and shutting off a power supply to the original scanning unit is realized in the control unit, and wherein another function for determining the power supply to the original scanning unit has been shut off, setting a second conveying speed of the original by the original conveying unit to be higher than the first conveying speed for when the original is scanned by the original scanning unit, and controlling the original conveying unit to discharge the original more quickly at the second conveying speed is realized in the control unit.

* * * * *